United States Patent [19]
Britz

[11] 3,953,131
[45] Apr. 27, 1976

[54] OPTO-ELECTRONIC ANTENNA SYSTEM FOR LASERS

[76] Inventor: Hans Ernst Britz, Ludwig Quidde Str. 23, 6000 Frankfurt am Main 56, Germany

[22] Filed: Mar. 4, 1974

[21] Appl. No.: 447,814

[30] Foreign Application Priority Data
Mar. 2, 1973  Germany............................ 2310515
Oct. 4, 1973  Germany............................ 2349807
Dec. 6, 1973  Germany............................ 2360781

[52] U.S. Cl................................ 356/141; 356/152; 350/22; 350/213; 250/227; 250/578
[51] Int. Cl.²......................................... G01B 11/26
[58] Field of Search............................ 356/141, 152; 350/175 SL, 213, 22; 250/227, 578

[56] References Cited
UNITED STATES PATENTS
3,329,818  7/1967  Woehl................................ 250/227
3,691,483  9/1972  Klein................................. 332/7.51

FOREIGN PATENTS OR APPLICATIONS
1,273,835  7/1968  Germany...................... 350/175 SL Primary Examiner—Maynard R. Wilbur
Assistant Examiner—S. C. Buczinski
Attorney, Agent, or Firm—Craig & Antonelli

[57] ABSTRACT

An opto-electronic antenna system includes a plurality of transmitting/receiving antennas disposed over a prescribed geometrical surface such as a sphere. To the antennas are optically coupled transmitter/receiver units such as photo-detectors or laser transmitters. The antenna units are scanned electronically according to their position on the geometrical surface by supplying to the individual units, signals differing in phase in accordance with the position of the antenna with which the units are associated both in the vertical and horizontal directions. An evaluation circuit is associated with each unit for determining the azimuth and elevation directions of received radiation.

10 Claims, 21 Drawing Figures

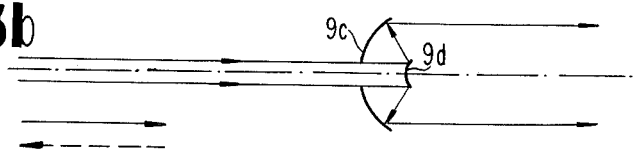
FIG.3b
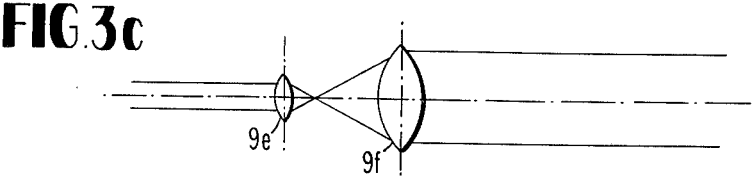
FIG.3c
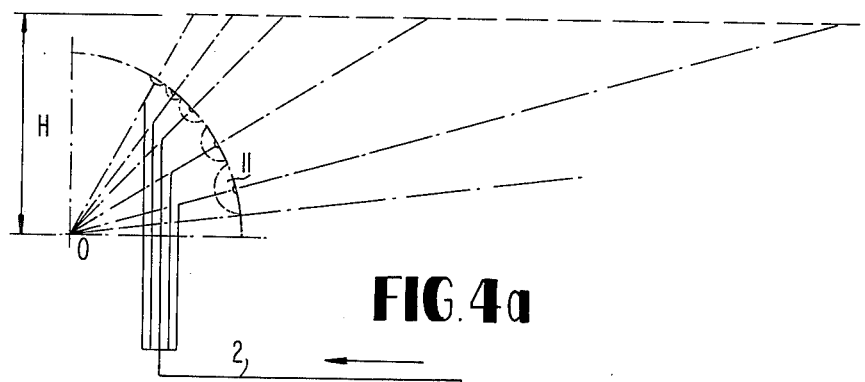
FIG.4a
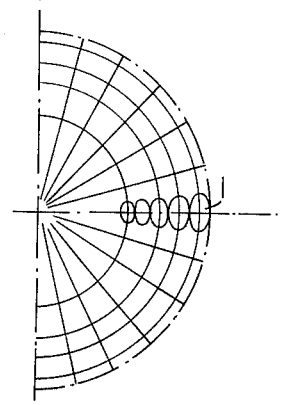
FIG.4b
FIG.5
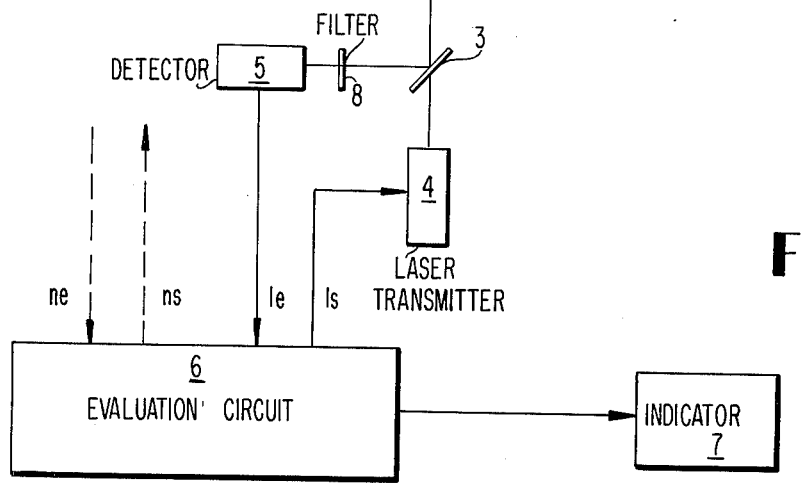
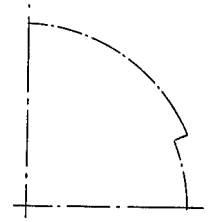
FIG.6 f. ELEVAT. 45°
$F_I\, 0123 = F_{II}\, 4567$

OPTO-ELECTRONIC ANTENNA SYSTEM FOR LASERS

BACKGROUND OF THE INVENTION

1. Field of the Invention

The present invention relates to an opto-electronic antenna system for use in pulse measuring technology, continuous measuring technology, and communications technology in space, the atmosphere, water, and on the ground and is especially useful in aeronautics and astronautics.

2. Description of the Prior Art

Directional antennas have been employed for wireless communications (at high frequencies) and for measurements in the field of radio-technology. Such directional antennas can be fixedly arranged (for use in connection with directional radio) or rotatably mounted (for radar applications). Moreover, of late, laser technology, which is presently undergoing substantial development, has employed the use of various types of optical antennas.

However, in the present state of the art, three-dimensional space scanning techniques have not yet been satisfactorily mastered in radar technology, since for one thing, the scanning velocity is quite low, and it is very difficult to increase the same, due to the rotation of the antennas and the pulse time delay involved. For an explanation of radar technology, attention may be directed to the periodical entitled "VDI Nachrichten" (German Engineer's Association News) No. 48, 1972, particularly the chapter entitled "Complicated Third Dimension" Radar Symposium in Ulm.

In the field of laser technology, extremely high standards must be satisfied with respect to the positional stability of both the transmitting and the receiving antennas and the practical usefulness is, accordingly, limited. For an explanation of laser technology in this respect, attention is directed to the publication entitled "Lasers", by Klaus Tradowsky, Vogel publishers, p. 127, as well as the periodical entitled "Rundfunktechnische Mitteilungen" (Radio Communication News) Vol. 16, No. 6, p. 291, 1972.

OBJECTS OF THE INVENTION

In light of the problems relating to the prior art, the present invention has been developed and makes it possible to effect a very rapid three-dimensional, space scanning operation by means of a stationary, non-rotatable, opto-electronic antenna system which employs laser beams.

Furthermore, in connection with such a system, the present invention makes use of a process involving the spacial direction finding of laser beams and beams having similar propagation characteristics, reflected pulses, foreign pulses, as well as pulse sequences of transponders with the aid of an electronic evaluation circuit.

BRIEF SUMMARY OF THE INVENTION

In accordance with the present invention, optical or opto-electronic antennas, having solid angles with respect to one another, are arranged so that a spherical-type characteristic is produced, formed by the apertures of the antennas (optical).

The opto-electronic antenna system is sub-divided along longitudinal and latitudinal lines, and the optical or opto-electronic antennas are disposed at the points of the intersections of these longitudinal and latitudinal lines. The fineness of the subdivisions depends upon the accuracy requirements which the opto-electronic system must meet.

Moreover, the outputs of all of the optical and/or opto-electronic antennas, which are arranged within a solid angle component of $\theta°$ in the horizontal and vertical directions, are correlated with a common receiver. These antenna outputs are modulated and shifted in phase with respect to one another, so that each solid angle component is associated with a specific phase position for purposes of identification. The resultant phase position is formed in accordance with magnitude and direction by a subsequent amplitude selection, according to the magnitude and phase and a subsequent electronic addition of two adjacent, selected, solid angle components. As a result, it is possible to determine, in a simple electronic manner, even without the use of a transponder, the solid angle, by means of an individual and, moreover, fixedly disposed antenna arrangement.

The opto-electronic antenna system can, moreover, be spherical or similar to a sphere in shape, or it can consist of fragments of such shapes, or it may be composed of a plurality of such fragments. The individual optical and/or opto-electronic antennas can have, for each latitude (or portion thereof) different or addiational antenna aperture diameters. In this regard, conventional optical antenna configurations may be employed.

As a result of the present invention, it is possible to attain a higher space scanning velocity than in the case of radar and, moreover, as was mentioned previously, since the antennas are fixed, the use of moving parts is avoided. Also, since a large number of lasers may be available for space scanning, the pulse efficiency of the lasers can be increased.

Moreover, measuring both distance and altitude can be effected simultaneously through one arrangement and, at the same time, through a cyclical scanning operation, a total pulse sequence can be obtained which surpasses the pulse sequence afforded by an individual laser.

BRIEF DESCRIPTION OF THE DRAWINGS

FIGS. 3a–3c illustrate various forms of optical-antennas which may be employed in the present invention;

FIG. 4a depicts a system of the present invention in block diagram form;

FIG. 4b is a sectional view of the hemispherical antenna pattern of FIG. 2;

FIG. 4c is a perspective view of a spherically patterned antenna system with the block diagram of the invention as shown in FIG. 4a;

FIG. 5 depicts a modified fragmented spherical antenna arrangement which may be used in accordance with the principles of the present invention;

FIG. 6 illustrates a cross-sectional view of a plurality of light conducting pipes which may be employed in the system shown in FIG. 4a;

DETAILED DESCRIPTION OF THE INVENTION

Figure 1:
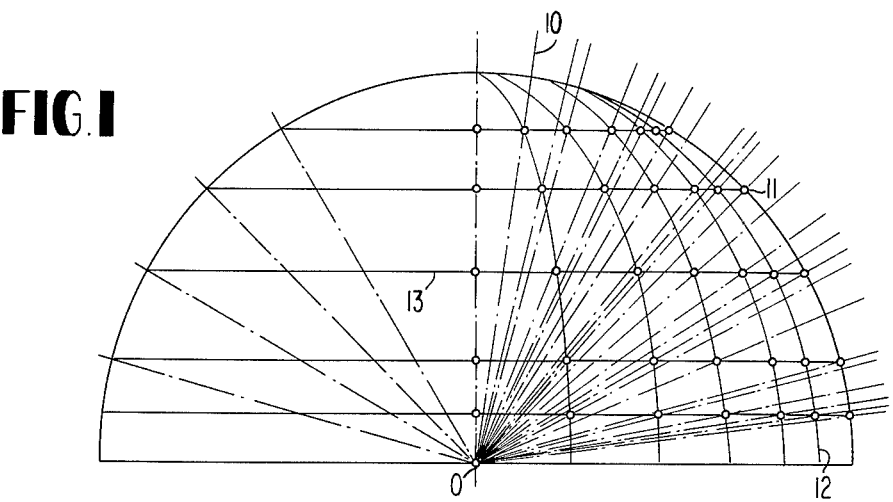
FIG. 1 depicts the front view of an opto-electronic system arranged in a hemispherical form in accordance with the present invention.

With reference now to FIG. 1, there is depicted a front view of an opto-electronic antenna system in accordance with the present invention, arranged on the surface of a hemisphere. The optical axis of each end of the optical and/or opto-electronic antennas 11, which axes are disposed at solid angles with respect to one another, extends through the points of intersection of the latitudinal lines 13 and the longitudinal lines 12. All of the optical axes have a common base the center 0 of the hemisphere and/or sphere.

Figure 2:
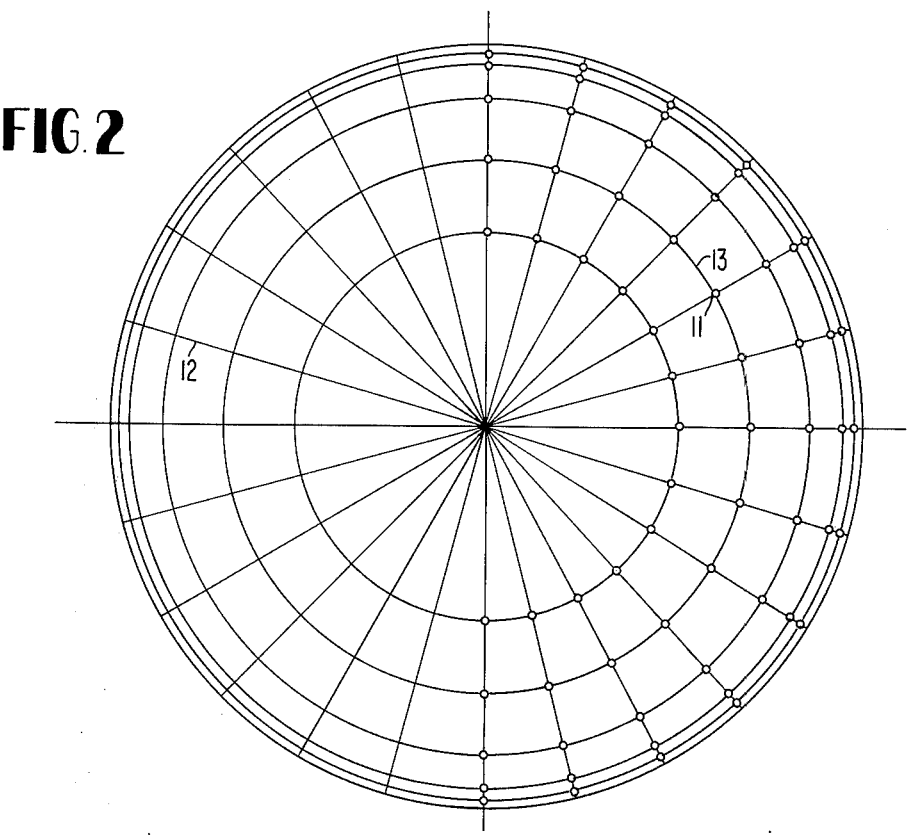
FIG. 2 depicts the top view of a hemispherial opto-electronic antenna system shown in FIG. 1.

FIG. 2 is a top view of the hemispherical arrangement shown in FIG. 1, with the respective antennas 11 shown as dots at the intersections of the longitudinal line 12 and the latitudinal lines 13. In the figure, the antennas are illustrated only in the righthand portion of the figure for simplicity in the illustration, but, of course, are disposed over the entire surface of the hemisphere.

Figure 4C:
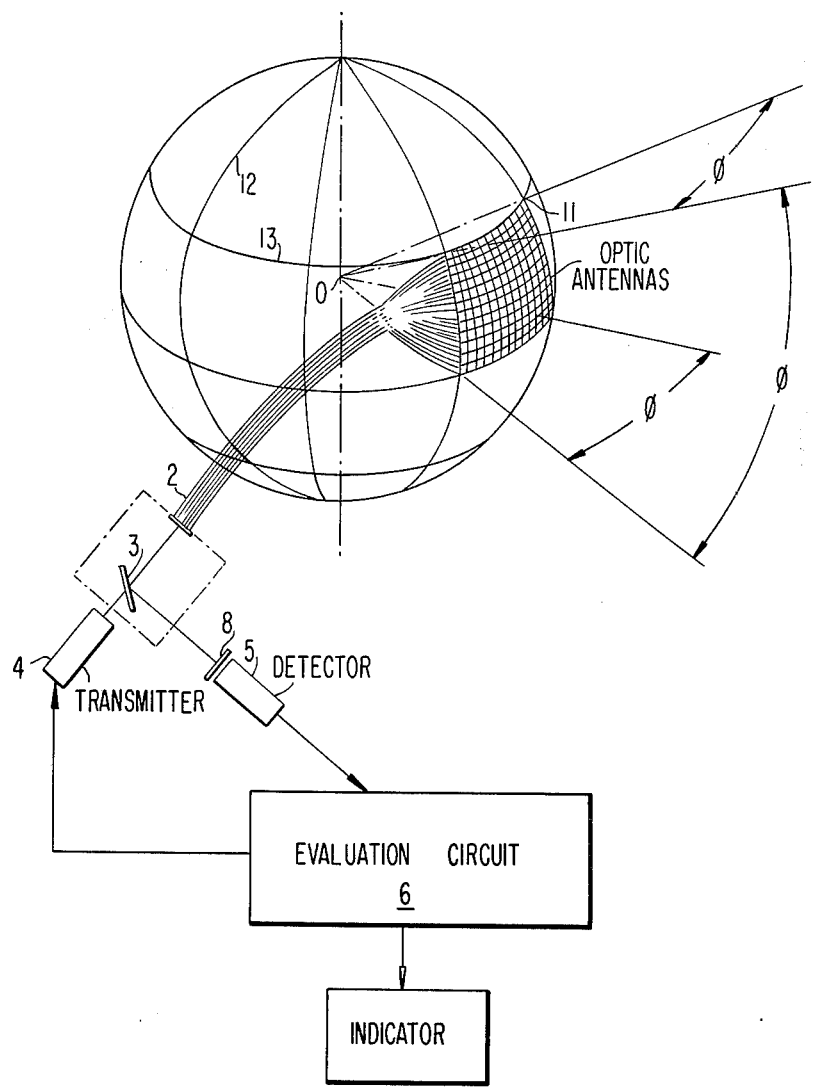

For a more detailed illustration of use of the above hemispherical arrangement, attention is directed to FIGS. 4a, 4b and 4c of the drawings, the latter figure showing a total spherical arrrangement of the antennas. Now, for each antenna 11, disposed on the surface of the hemisphere, there will be a beam pattern, which begins at the center of 0 of the hemisphere and extends outwardly into space. For an aircraft or satellite travelling at an altitude H, with respect to the center of the hemispherical arrangement, those antennas which are at the lowermost or base portion of the hemisphere will have a wider aperture, with respect to the altitude of the aircraft or satellite, than those at the top of the hemisphere. An illustration of these aperture diameters 1 is shown in FIG. 4b, with the apertures 1 becoming smaller, as one views the top of the hemispherical arrangement shown in FIG. 4a, beginning with the base line of the hemisphere and proceeding towards the top. The larger the aperture diameter, the higher or sharper will be the beam focusing, so that the larger will be the attainable range of the system. The same characteristic applies to either the transmission or reception of radiation, and a lower beam intensity necessitates a larger antenna diameter.

Now, in the system shown in FIGS. 4a and 4c, the antennas 11 are connected by way of light conductors 2, to a beam splitter 3, which is disposed in the path of a transmitting laser 4 and an optical detector 5. In operation, the transmitting laser 4 is energized by a signal on line 1s from the control and evaluation circuit 6, to be discussed in detail hereinafter, and the output of the laser is transmitted by the light conductors 2 to the antennas 11 for radiation into space. Similarly, radiation which is received by the antennas is transmitted by the light conductors 2 to the beam splitter 3, is filtered by filter 8, and impinges upon detector 5. The output of detector 5 is provided by a signal line 1e to circuit 6 for evaluation. Connected to the output of the evaluation circuit 6 may be an indicator 7.

As was mentioned above, between the beam splitter 3 and the antenna array are light conductors 2 which may have a cross sectional form as shown in FIG. 6. Details of such light conductors are described in Radio Communications News, Vol. 16, No. 6 p. 294 and 295, 1972 and in the publication Radio Technology. p. 558, No. 16, 1972.

The control and evaluation circuit 6 may also have additional antenna systems connected thereto and, for illustration purposes, the connecting lines therefore are shown as lines ns and ne which are connected to similar components as are lines 1e and 1s, but these components are not illustrated for purposes of simplifying the drawing.

Figure 3A:
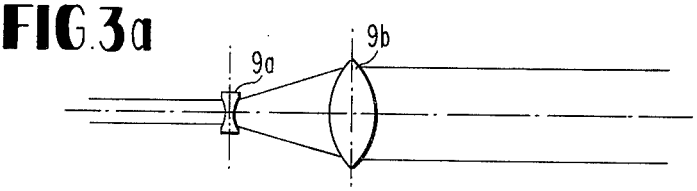

In the antenna system, per se, either reflecting or refracting systems, such as illustrated in FIGS. 3a and 3c may be employed. In FIG. 3a, a concave-convex lens pair 9a, 9b is employed for converting a first collimated beam to a second collimated beam of different diameter. A similar effect is attainable with the pair of reflectors 9c, 9d shown in FIG. 3b, or by the use of a pair of convex lenses 9e and 9f as illustrated in FIG. 3c.

As was mentioned above, in the system shown in FIGS. 4a and 4c, a transmission laser 4 and an optical detector 5 are connected by way of light conductors 2 to the same hemispherically or spherically arranged antenna system. Moreover, a number of such systems may be connected to the circuit 6.

However, rather than employ both a transmitting and receiving system as a singular unit, the antenna systems may be divided into two separate systems, so that one system contains only transmitting antennas and the other system contains only receiving antennas, separated from each other by an appropriate distance. As a result, in one system, i.e. the transmitting system, the photodetector 5 and beam splitter arrangement 3 will not be necessary, but only the laser 4 will be connected to the antennas for transmiting the radiation, while in the receiving system, only a photodetector system will be connected thereto for receiving the radiation transmitted by the spaced apart transmitting system. Moreover, in the transmission system per se, a signal evaluation circuit and an indicator need not be included.

Also, the surface area defining the antenna pattern may be fragmented, as shown in FIG. 5, to intersecting portions of spheres of different radii but having a common center.

Figure 7:
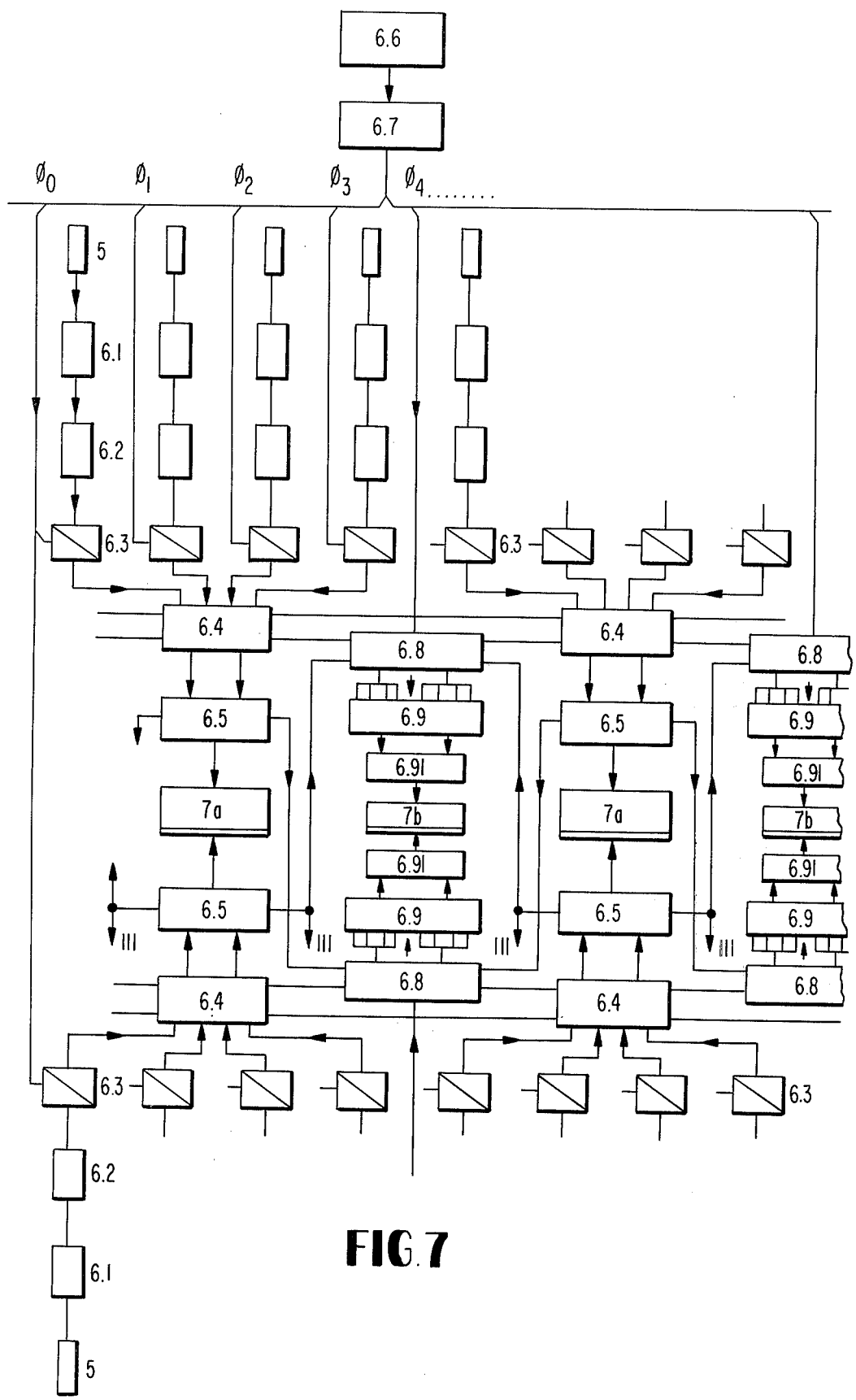
FIG. 7 illustrates, in block diagram form, an electronic evaluation circuit employed in the system in accordance with the present invention.

The evaluation and control circuit 6 is shown in FIG. 7, in block diagram form. In the figure, a plurality of identical receiver units are shown at the top portion of the figure and at the bottom portion of the figure, with adjacent identical blocks omitted for purposes of simplification. The circuit 6, previously referred to in FIG. 4a, is connected to each of a plurality of detectors 5 through associated circuitry along respective signal lines 1e, 2e, . . . ne. In FIG. 7, itself, each of these respective photodetectors 5 is associated with a specific angle $\theta_0, \theta_1, \ldots \theta_n$ depending upon its position in the hemispherical array. Photodetectors suitable for use are of the type described on Page 31 of the publication "Color Television", Problems and Solutions, book I by H. Schönfelder, Fernseh GmbH. Darmstadt, Germany, Justus Von Liebig publishers; The publication "Lasers"

by K. Tradowsky, Vogel Publishers, p. 100–105; and book II of the above mentioned Color Television publication, pages 17, 47, and 53, in particular, for example. In other words, the opto-electronic antenna system proper is subdivided electronically into $n\theta°$ of identical section, in the horizontal and vertical planes (in case of a hemisphere array; $n.\theta/4$ for the vertical plane). Thus, each optical and/or opto-electronic antenna which is distributed on the geometrical surface defining the antenna array within a solid angle of $\theta°$ in the horizontal and vertical directions, namely, one subtending a square angle of $\theta^{2°}$, is associated with the same receiver unit 5 for that solid angle $\theta_i°$, where $0 \leq i \leq n$.

Figure 15:
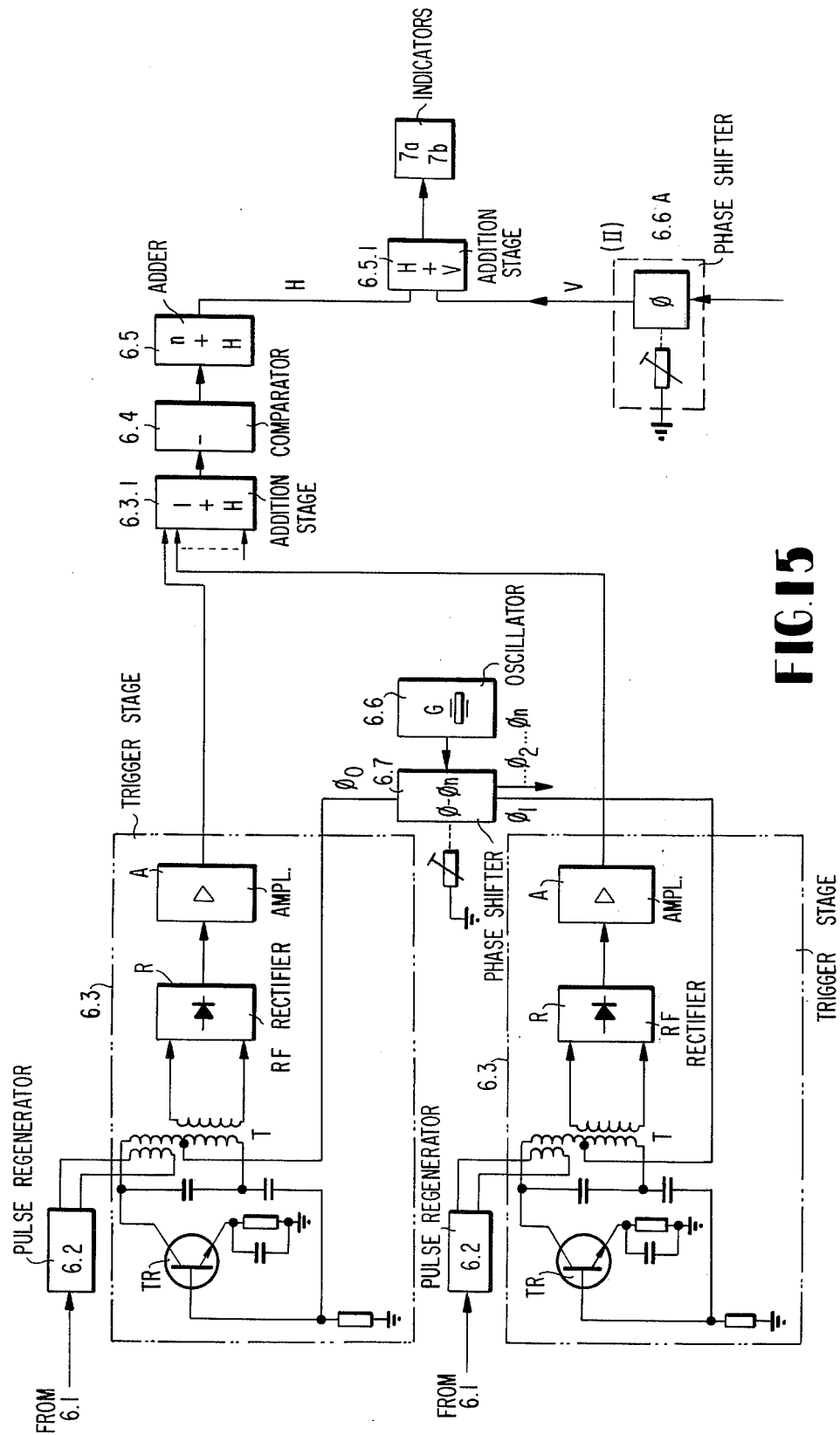

The output of each optical detector 5, which is connected with the light pipe associated with a respective solid angle subtending antenna, as shown in FIG. 4a, is connected to an amplifier 6.1. An amplifier suitable for use is of the type employed in a color television scanner. As an example, refer to the publication "Secondary Radar" by Peter Honold, Siemens publishers, Germany, 1971, pages 106–110, and pages 53 of book II of "Color Television" by H. Schönfelder, previously referred to. The amplified output signal is then supplied to a pulse regenerator 6.2, whose output is connected to a respective trigger stage 6.3. At the input of each trigger stage 6.3 is a signal line from an oscillator and frequency multiplier 6.6, and a phase generator circuit 6.7. The output of the phase generator 6.7 is a voltage corresponding to the frequency of the oscillator and frequency multiplier 6.6 and the phase thereof and this voltage will be controlled in dependence upon the output of the pulse regenerator 6.2 connected to the trigger stage 6.3. As an example of a suitable pulse regenerator, reference may again be made to the above described publication "Secondary Radar", particularly pages 110, 111. The details of a trigger stage, per se, are shown in FIG. 15, which includes a transistor T$r$ coupled together with the output of the pulse regenerator 6.2 and a phase shift signal from phase shift circuit 6.7 to the input winding of transformer T. The secondary output winding of the transformer is supplied to an R-F rectifier R and the rectified output is then amplified in a series connected amplifier A. The center top of the secondary winding of each transformer T is connected to the phase shift circuit 6.7 which, in turn, is connected to oscillator 6.6 The oscillator 6.6 may be a type XSE described in "News from Rohde and Schwary," Germany, 41, February/March p. 17–21 1971. The details of the phase shift circuit 6.7 are depicted in FIG. 13.

Figure 13:
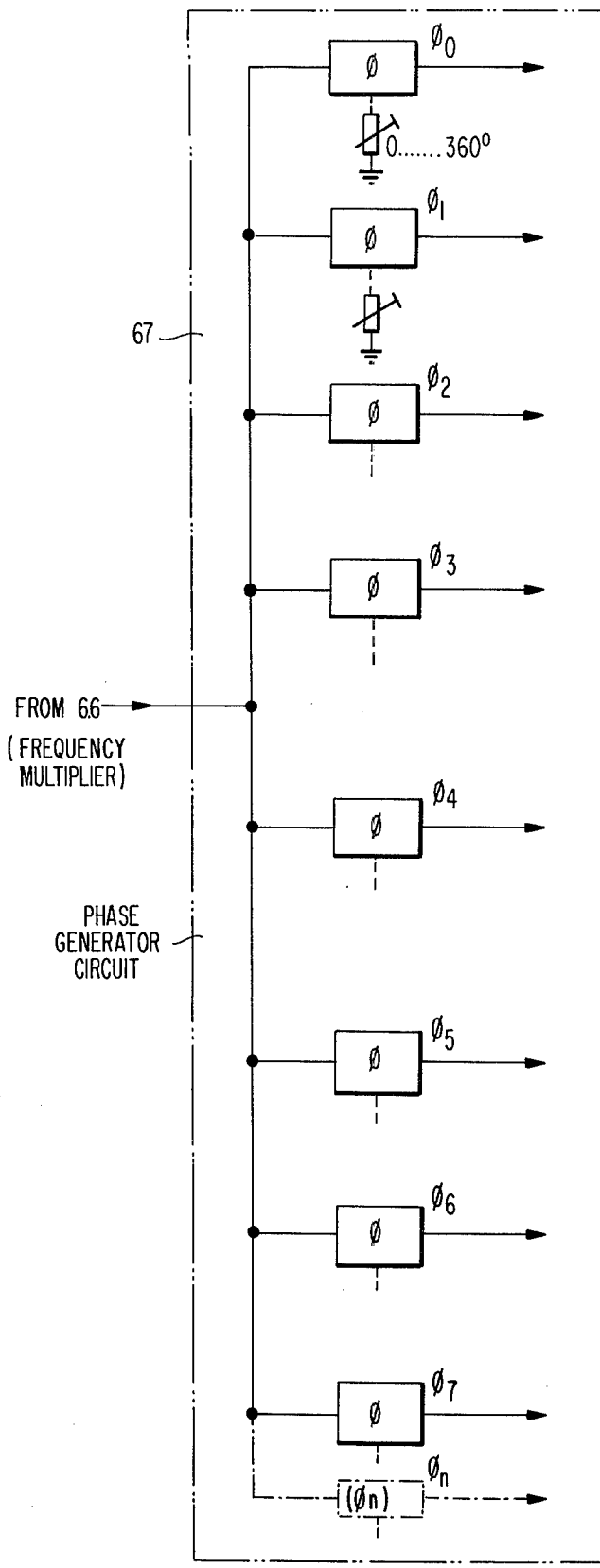
FIGS. 13–15 are schematic diagrams of interconnected circuit components employed in the electronic evaluation circuit depicted in FIGS. 7 and 12.

In the phase shift circuit 6.7 proper, shown in FIG. 13, a plurality of individual phase shift circuit components are connected in common to the output of oscillator 6.6 (not shown). Each phase shift circuit component is provided with an adjustable potentiometer for setting the degree of phase shift to be imparted to the oscillator signal applied to its input. Again, for a reference to the type of circuit suitable for providing such a phase shift attention may be directed to the above-mentioned publication "Color Television" by H. Schönfelder, book II, p. 51 and book III, pages 87, 89 and 97. Thus, the phase shift circuit 6.7 provides a plurality of phase shifted signals $\theta_o$–$\theta_n$ at the plural outputs thereof, which are to be supplied to the respective trigger stages 6.3, shown in FIG. 7.

Figure 14:
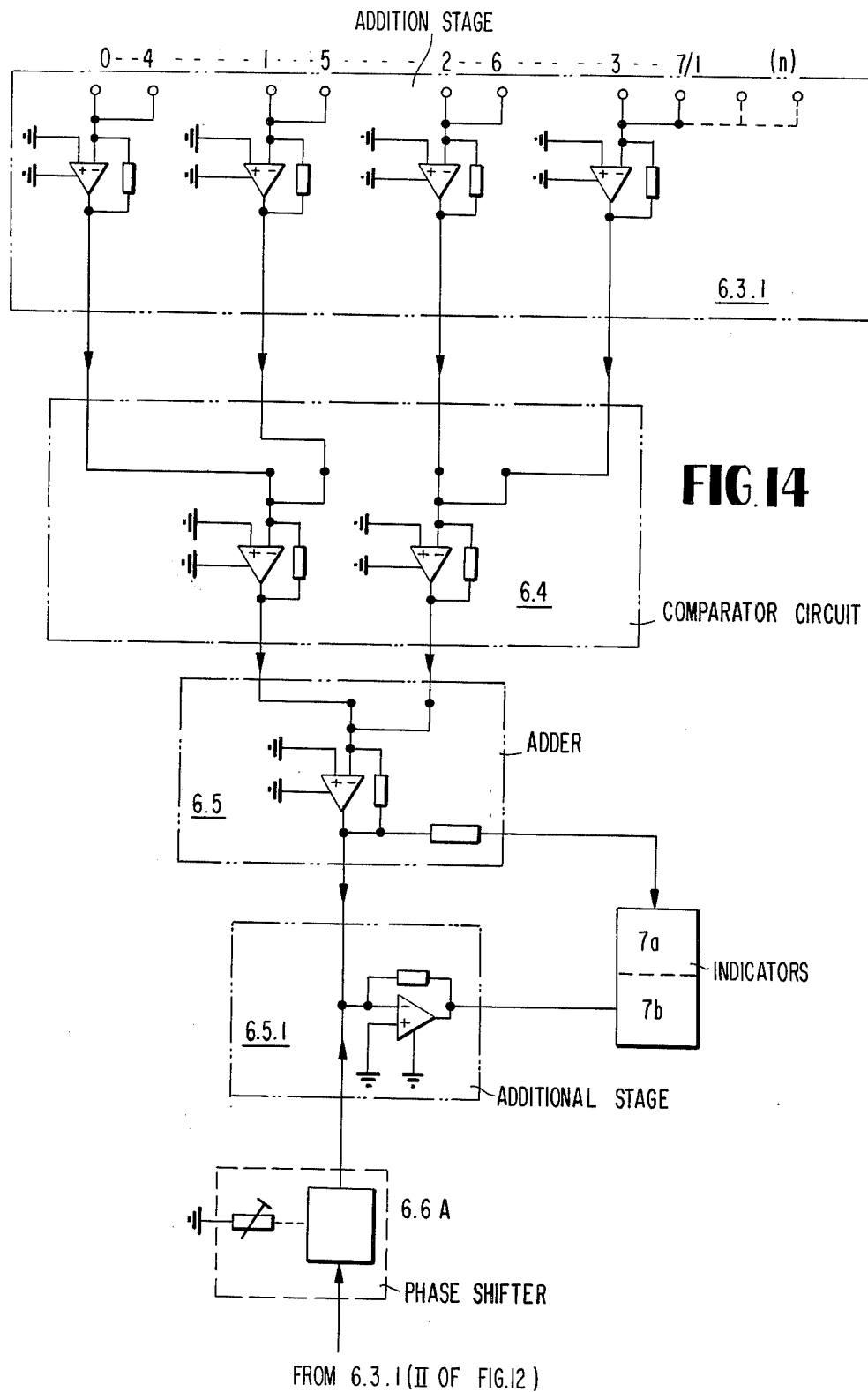

This voltage is delivered, in n different phase positions, broken down into $360/n°$ of position, to the respective trigger stages 6.3 for the respective angle positions $\theta_1, \theta_2, \theta_3, \ldots \theta_n$, mentioned previously. The output of each trigger stage is then fed to an amplitude comparator circuit 6.4 which determines which pair of inputs thereto have the largest amplitudes and delivers phase signals to a summing circuit or adder 6.5. The amplitude comparator circuit is shown in detail in FIG. 14, connected between stage 6.31 and adder circuit 6.5. As shown in the figure the comparator 6.4 includes a pair of analog summing amplifier circuits receiving horizontal plane solid-angle component representative signals, all having the same angle $\theta_i$ in the vertical plane. From the comparator circuit, the pair of component signals are supplied to the summing amplifier of adder 6.5, also shown in detail in FIG. 14. Such amplifier circuitry components are also described, for example, in the publication "International Electronic Panorama," 1974, No. 1, Page 3, and on pages 211, 213 of the above referred to Book II of "Color Television" by H. Schonfelder. In the summing circuit 6.5, the two components supplied thereto are added together and these two components are phase shifted with respect to each other by an angle $\theta$ and the resultant signal is supplied to a horizontal indicator 7a and displayed therein in accordance with their phase relationship. The depicted phase position will indicate the horizontal reception direction (azimuth). Indicators 7a and 7b are activated only once during the operation of the system, although a plurality of the same are illustrated in the figure. As a suitable form of the indicators 7a, 7b, an oscilliscope, or alpha numeric display, such as described on pages 46 and 47 of the previously mentioned publication "Secondary Radar" by Peter Honold, may be used.

Figure 8A:
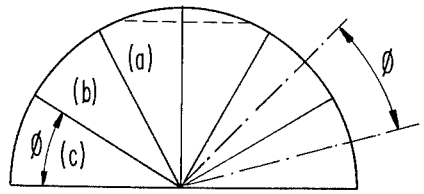
FIGS. 8a and 8b depict hemispherical antenna arrangements which may be distributed in accordance with the present invention.
Figure 9:
FIG. 9 is a vector diagram for explaining the antenna arrangements shown in FIGS. 8a and 8b.

For vertically adjacent solid angle components, such as vertical angles (a), (b) and (c), as shown in FIG. 8a, the two largest components of two adjacent area sections are combined with one another in the summing circuit, as mentioned previously in connection with the horizontal components. The sizes of the respective areas in the sectioned hemisphere, shown in FIG. 8a, will be proportional to the receiver response in section (a) and section (b) which produce the vector summation illustrated in FIG. 9. The resulting position of the vertical plane represents the vertical reception direction in the indicator 7b.

In FIG. 7, suitable phase generator control circuits 6.8 are connected between the respective comparator circuits 6.4 for sequentially activating the same and controlling the operation of the summing circuits 6.5. The outputs of the summing circuits 6.5 on lines 111 are connected for processing signals for the third vertical plane (c), and to the circuits 6.8 for the vertical plane. Connected thereto are respective amplitude selectors 6.9 each of which selects the two largest amplitudes supplied thereto and delivers the same to the addition circuit 6.91. These summing or addition circuits for processing vertical component signals may also have the configuration of the summing circuits described and referred to above, for processing the respective horizontal component signals. As a result, the output of the summing or addition circuit 6.91 is the resultant amplitude with the phase position corresponding to the vertical reception direction, which is indicated on indicator 7b.

Figure 8B:
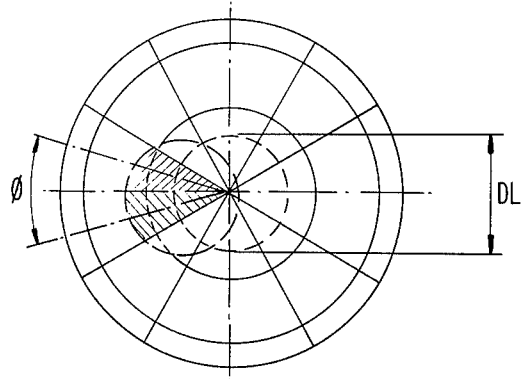

The antennas which are disposed in the above example are disposed within a circle having a diameter $D_L$, shown in FIG. 8b and, if four adjacent solid angle components, namely those shaded in FIG. 8b, are evaluated simultaneously, the degree of accuracy of the direction finding operation will be increased.

Figure 10A:
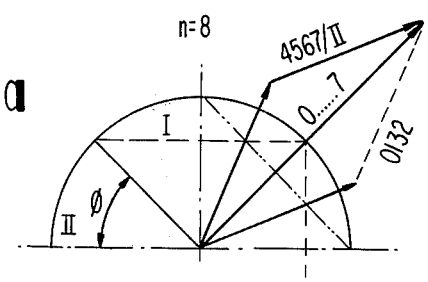
FIGS. 10a and 10b and 11 depict antenna beam-vector patterns for explaining a further embodiment of the invention.
Figure 10B:
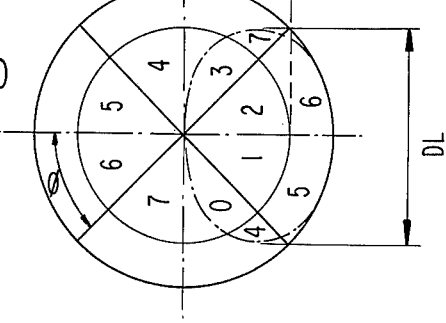
Figure 11:
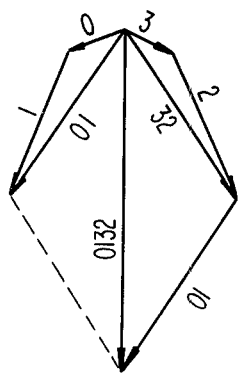
Figure 12:
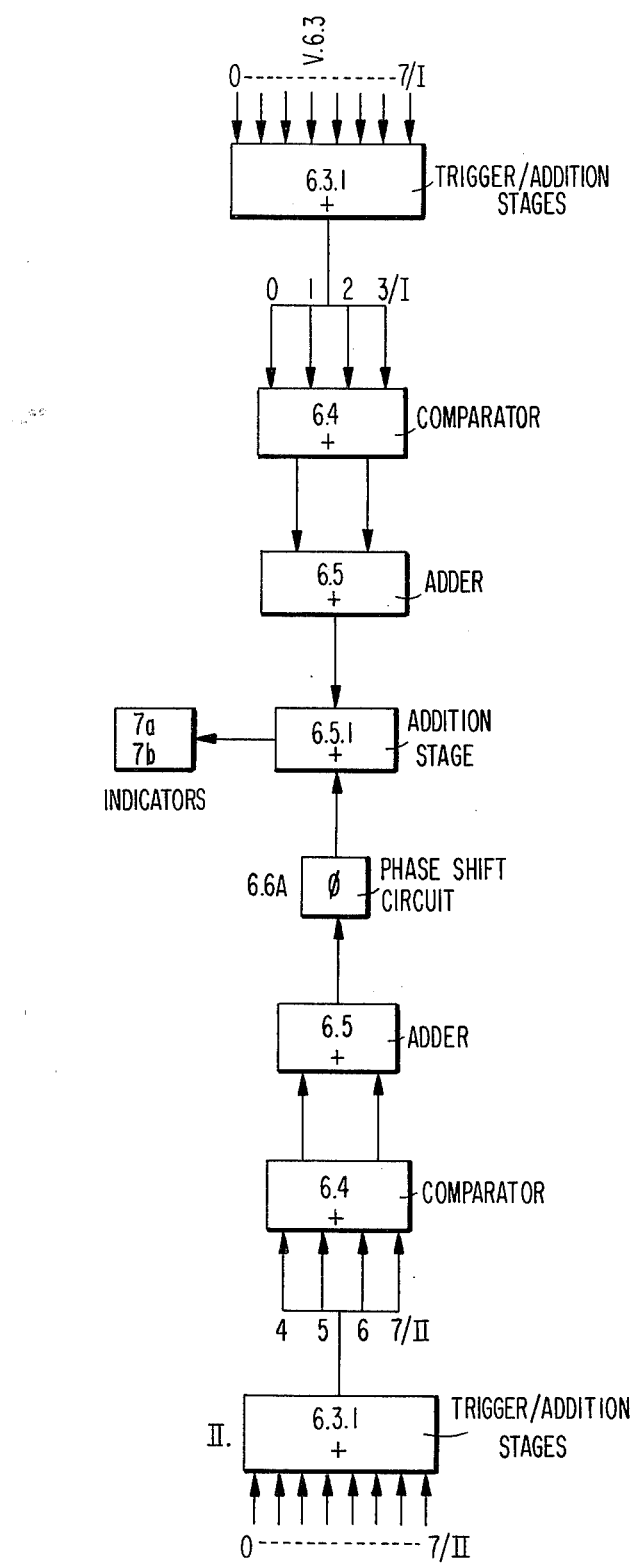
FIG. 12 depicts a portion of the electronic evaluation circuit depicted in FIG. 7, in which a plurality of adjacent azimuth inputs for respective elevational antenna directions are processed.

Now, in a further embodiment of the invention as depicted in FIG. 12, and with reference to the antenna beam-vector diagrams of FIGS. 10 and 11, for each angular section of elevation, such as section II subtending the angle $\theta$ in the vertical direction, the azimuthal antenna pattern may be separated into $n$ adjacent subdivisions (e.g. as shown in FIG. 10, $n = 8$). For a 360° scan of section II of FIG. 10, each individual trigger stage 6.3 of FIG. 7 will receive a plurality of inputs 0 . . . 7/I corresponding to the respective $n$ subdivisions ($n = 8$ in FIG. 10). For a particular antenna aperture, a prescribed number of subdivisions of that section (e.g. I or II) will be included. Thus, as is shown in FIG. 10(b), for section I, subdivisions 0, 1, 2, 3 will be covered, while in section II, subdivisions 4, 5, 6 and 7 are covered.

The vector diagrams of FIGS. 10 and 11 illustrate the respective antenna output components for an angle of elevation of 45°. The respective components of the separate section are processed by the stages of the electronic calculation circuit of FIG. 7, as shown in FIG. 12. In FIG. 12, however, a phase shift circuit 6.6 A is connected between the output of the adder circuit 6.5 for antenna elevation section II (in the lower portion of FIG. 12) and one of the inputs of common addition stage 6.5.1 for both sections I and II. The circuitry details of each of the respective upper and lower half stages I and II shown in FIG. 12 are depicted in detail in FIG. 14, referring to above. The addition stage 6.5.1 and phase shifting circuit, respectively, are of the type shown referred to previously in connection with the adder circuitry of FIG. 14 and the phase shift circuit components of FIG. 13.

FIG. 15, in addition to showing the details of the trigger stages, and the manner in which each is connected to phase shift circuit 6.7 and oscillator 6.6 as described above with respect to FIG. 7, also shows how the remaining addition stage 6.3.1, comparator 6.4, adder 6.5, phase shifter 6.6A, addition stage 6.5.1 and indicators 7a, 7b, are connected to the respective trigger stages for the various horizontal and vertical angular components. As can be seen from FIGS. 12, 14 and 15 the spherical area proportions associated with this angle of inclination (45°) of of identical size in both section, i.e.

$$F_I\ 0, 1, 2, 3, = F_{II}\ 4, 5, 6, 7,.$$

This equation holds for all $n > 8$.

It will be appreciated, therefore, that the present invention provides an opto-electronic antenna system which permits rapid and controllable three-dimensional scanning by means of a stationary electronic laser antenna array controlled in accordance with respective signals, corresponding to the various sections of a prescribed surface, such as a hemisphere, the identification of which signals is effected in accordance with prescribed the phase shifts of the signals relation to one another, for both vertical and horizontal components.

While I have shown and described several embodiments in accordance with the present invention, it is understood that the same is not limited thereto but is susceptible of numerous changes and modifications as known to a person skilled in the art, and I, therefore, do not wish to be limited to the details shown and described herein but intend to cover all such changes and modifications are are obvious to one of ordinary skill in the art.

What I claim is:

1. An opto-electronic antenna system for transmitting and/or receiving laser radiation comprising:
   a plurality of stationary antennas disposed on a prescribed geometrical surface, the optical axis of each antenna being disposed at a solid angle with respect to the optical axes of the other antennas and intercepting a single base point; and
   means for effecting cyclical scanning of said plurality of antennas,
   wherein said geometrical surface is that of a plurality of spherical sections having different diameters, which are subdivided along the same longitudinal and latitudinal lines, at the intersection of which said antennas are disposed.

2. An opto-electronic antenna system for transmitting and/or receiving laser radiation comprising:
   a plurality of stationary antennas disposed on a prescribed geometrical surface, the optical axis of each antenna being disposed at a solid angle with respect to the optical axes of the other antennas and intercepting a single base point; and
   means for effecting cyclical scanning of said plurality of antennas,
   wherein each antenna has an aperture diameter which differs from the aperture diameters of the other antennas and varies in accordance with the latitudinal position of the respective antenna on said geometrical surface.

3. An opto-electronic antenna system for transmitting and/or receiving laser radiation comprising:
   a plurality of stationary antennas disposed on a prescribed geometrical surface, the optical axis of each antenna being disposed at a solid angle with respect to the optical axes of the other antennas and intercepting a single base point; and
   means for effecting cyclical scanning of said plurality of antennas,
   wherein said antennas are disposed over said geometrical surface, so as to define a plurality of adjacent antenna apertures in both vertical and horizontal directions, thereby subtending adjacent solid angle, and wherein said means for effecting the cyclical scanning of said plurality of antennas includes first means, coupled to each of said antennas, for generating a signal indicative of the aperture position of each antenna on said geometrical surface, the phase of which differs from the phase of signals indicative of the aperture positions of adjacent antennas in accordance with the position of said aperture on said surface.

4. An opto-electronic antenna system according to claim 3, wherein said cyclical scanning means further includes second means, coupled to each of said antennas, for selectively transmitting thereto or receiving therefrom optical radiation signals.

5. An opto-electronic antenna system according to claim 4, wherein said cyclical scanning means further includes third means, coupled to said second means, for providing a first signal representative of the selective energization of said second means associated with a respective one of said antennas.

6. An opto-electronic antenna system according to claim 5, wherein said first means of said cyclical scanning means is, coupled to each of said third means, for generating a plurality of second signals corresponding to the selective energization of each of said second means associated with a respective antenna, each of said second signals differing in phase relative to one another in accordance with aperture positions of the respective antennas in said geometrical surface.

7. An opto-electronic antenna system according to claim 6, wherein each of said second means comprises a radiation detector, optically coupled to the respective antennas of said plurality of antennas, and each of said first signals includes a component corresponding to received radiation.

8. An opto-electronic antenna system according to claim 7, wherein said cyclical scanning means comprise fourth means, responsive to said first and second signals, for producing a plurality of third signals representative of amount of radiation received at the respective antenna positions on said geometrical surface and the position at which the radiation is received, and fifth means, responsive to said third signals, for determining the direction from which said radiation is being received on said geometrical surface.

9. An opto-electronic antenna system according to claim 8, wherein said fifth means comprises a plurality of summing circuit means connected to the respective ones of said fourth means, for comparing received radiation signals for adjacent antenna positions and for summing the signals having the two largest amplitudes, and further including indicator means, coupled to said summing circuit means, for indicating the respective horizontal and vertical reception directions of said radiation in response to said largest amplitude signals.

10. An opto-electronic antenna system according to claim 8, wherein said geometrical surface is at least a portion of a sphere and said antenna positions subtend solid angles of equal magnitude of the spherically shaped surface, and wherein the phase differences between each of said second signals corresponding to the degree of division of said spherically shaped surface into the antenna apertures thereof.

* * * * *